US 8,881,276 B2

United States Patent
Kratzer et al.

(10) Patent No.: US 8,881,276 B2
(45) Date of Patent: Nov. 4, 2014

(54) DYNAMICALLY GENERATED WHITELIST FOR HIGH THROUGHPUT INTRUSION PREVENTION SYSTEM (IPS) FUNCTIONALITY

(75) Inventors: Dean Kratzer, Menlo Park, CA (US); Anthony Hall, Austin, TX (US)

(73) Assignee: Cisco Technology, Inc., San Jose, CA (US)

( * ) Notice: Subject to any disclaimer, the term of this patent is extended or adjusted under 35 U.S.C. 154(b) by 2308 days.

(21) Appl. No.: 11/621,509

(22) Filed: Jan. 9, 2007

(65) Prior Publication Data
US 2008/0168558 A1 Jul. 10, 2008

(51) Int. Cl.
*G06F 21/00* (2013.01)

(52) U.S. Cl.
USPC ............ 726/23; 726/22; 726/24; 726/25; 726/27; 713/100; 713/151; 713/168

(58) Field of Classification Search
USPC ........................................... 726/23
See application file for complete search history.

(56) References Cited

U.S. PATENT DOCUMENTS 7,594,266 B2 * 9/2009 Mattsson et al. ............... 726/22
2003/0172292 A1 * 9/2003 Judge ............................ 713/200

FOREIGN PATENT DOCUMENTS

WO  WO 2006030227 A1 *  3/2006

OTHER PUBLICATIONS

"Shunting: A Hardware/Software Architecture for Flexible, HighPerformance Network Intrusion Prevention"; Gonzalez et al; CCS'07, Oct. 29-Nov. 2, 2007, Alexandria, Virginia, USA. Copyright 2007 ACM.*

* cited by examiner

*Primary Examiner* — Jason Lee
(74) *Attorney, Agent, or Firm* — Novak Druce Connolly Bove + Quigg LLP

(57) ABSTRACT

In one embodiment, detecting network data, retrieving a whitelist associated with the detected network data, and selectively applying an intrusion prevention policy based on the retrieved whitelist are provided.

14 Claims, 5 Drawing Sheets

DYNAMICALLY GENERATED WHITELIST FOR HIGH THROUGHPUT INTRUSION PREVENTION SYSTEM (IPS) FUNCTIONALITY

TECHNICAL FIELD

The present disclosure relates generally to a dynamically self generated and updated safe whitelist for Intrusion Prevention System (IPS) functionality in data networks.

BACKGROUND

Malicious code threat environment continues to evolve with dramatic increases in data communication threats. Inbound data communication traffic such as hypertext transport protocol (http) data and inbound electronic mail attachments to such data dominates the traffic that an Intrusion Prevention System (IPS) appliance must process. Currently, the IPS vendors must make decisions weighing the complete threat coverage with throughput. In one approach, some vendors compromise level of detection for potential malicious contents to increase throughput.

Other IPS appliances with more complete threat coverage are implemented such that if the central processor utilization approaches in excess of a predetermined level, such as approximately 90%, the IPS appliance no longer checks for malicious code for specific protocol data traffic threat (for example, electronic mail traffic, file transfer protocol (ftp) traffic, or web (http) traffic). Still other IPS appliances have a mechanism which allows for certain type of data traffic to be passed through unchecked. These approaches typically trade off between throughput and risking potential for increased attack by malicious codes if undetected.

SUMMARY

Overview

A method in particular embodiments may include detecting network data, retrieving a whitelist to apply to the detected network data, and selectively applying an intrusion prevention policy based on the retrieved whitelist. An apparatus in particular embodiments may include a storage unit configured to store a whitelist associated with network data, and a processing unit operatively coupled to the storage unit, the processing unit configured to detect network data, retrieve the whitelist from the storage unit, and to selectively apply an intrusion prevention policy based on the retrieved whitelist.

These and other features and advantages of the present disclosure will be understood upon consideration of the following description of the particular embodiments and the accompanying drawings.

DESCRIPTION OF EXAMPLE EMBODIMENTS

Figure 1:
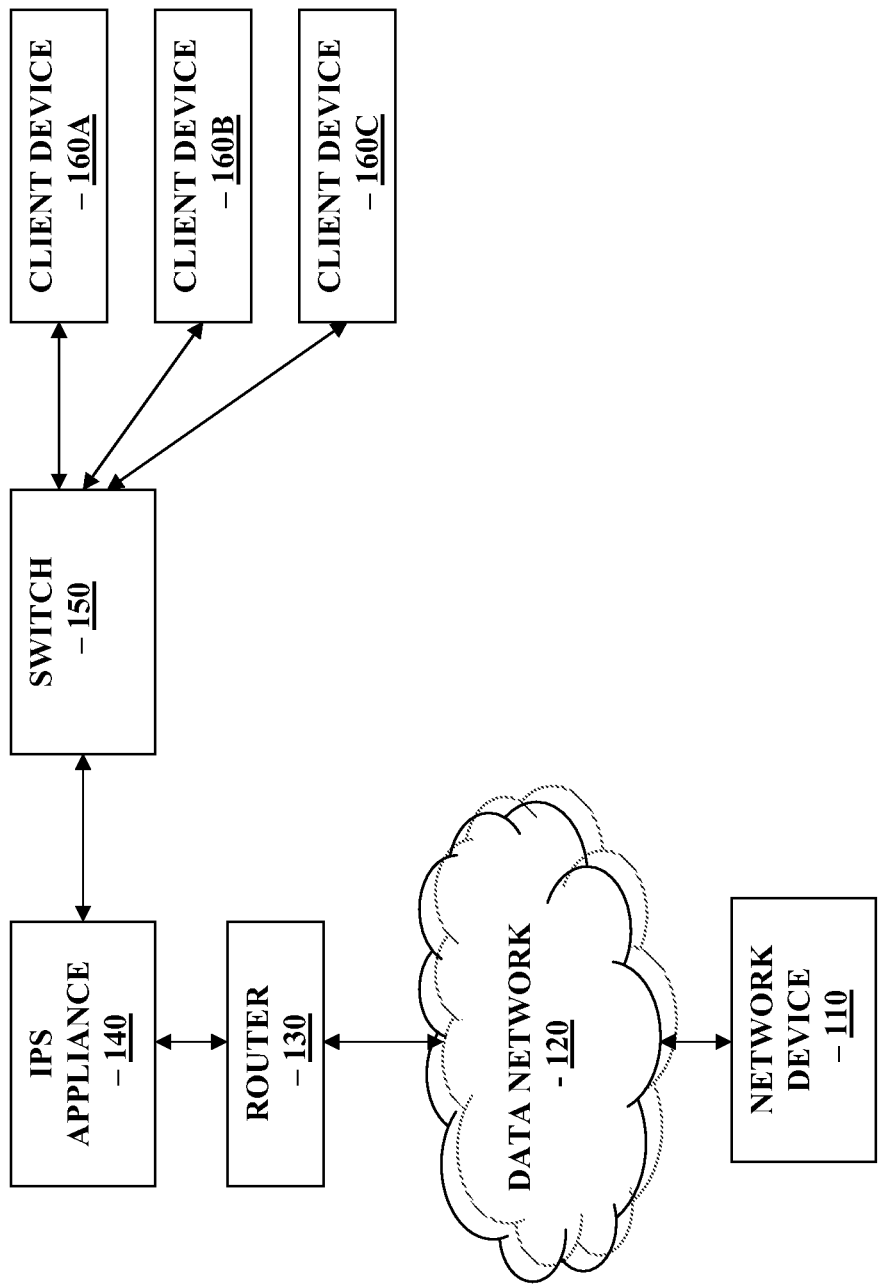
FIG. 1 illustrates an example system for dynamically generating and updating whitelist for high throughput IPS functionality.

FIG. 1 illustrates an example system for dynamically generating and updating whitelist for high throughput IPS functionality. Referring to FIG. 1, in particular embodiments, the overall system may include a data network 120 operatively coupled to a network device 110. In one embodiment, network device 110 may include, but not limited to, servers or client terminals. In particular embodiments, data network 120 may include one or more of a wide area network (WAN), a local area network (LAN), or a public data network such as the Internet. Referring to FIG. 1, in particular embodiments, while one network device 110 is shown, additional network devices may be provided, and each operatively coupled to the data network 120.

Also shown in FIG. 1 is a router 130 operatively coupled to the data network 120. The router 130 in particular embodiments may be further operatively coupled to an Intrusion Prevention System (IPS) appliance 140. Referring again to FIG. 1, the IPS appliance 140 in particular embodiments may be further operatively coupled to a switch 150 which may be in turn, operatively coupled to a plurality of client and/or server devices 160A, 160B, 160C. In particular embodiments, the IPS appliance 140 may include a separate stand alone device, or alternatively, the IPS appliance 140 may be incorporated in the router 130 or the switch 150, or with other security appliances in the system 100 that may be configured to incorporate the functionality of the IPS appliance 140.

As discussed in further detail below, in particular embodiments, the IPS appliance 140 may be configured to dynamically update a whitelist of data traffic sources including, for example, websites, IP addresses and/or data communication protocols. For example, in the case of web (http) traffic, the whitelist may include a list of websites, and further, in the case of ftp traffic, the whitelist may include a list of IP addresses, where the list of websites or IP addresses are associated with data traffic which was historically determined to include safe content.

More specifically, in particular embodiments, the IPS appliance 140 may be configured to generate and dynamically update the whitelist based on previously analyzed data traffic, and in particular, based on the frequency of in bound data traffic which was detected without any malicious code or content. That is, in particular embodiments, the IPS appliance 140 may be configured to generate the whitelist based on data traffic that does not include malicious content, and based on a predetermined content weighing analysis associated with the frequency of some particular network data, the whitelist may be dynamically updated to pass data traffic that is likely requested and historically does not include malicious content.

Figure 2:
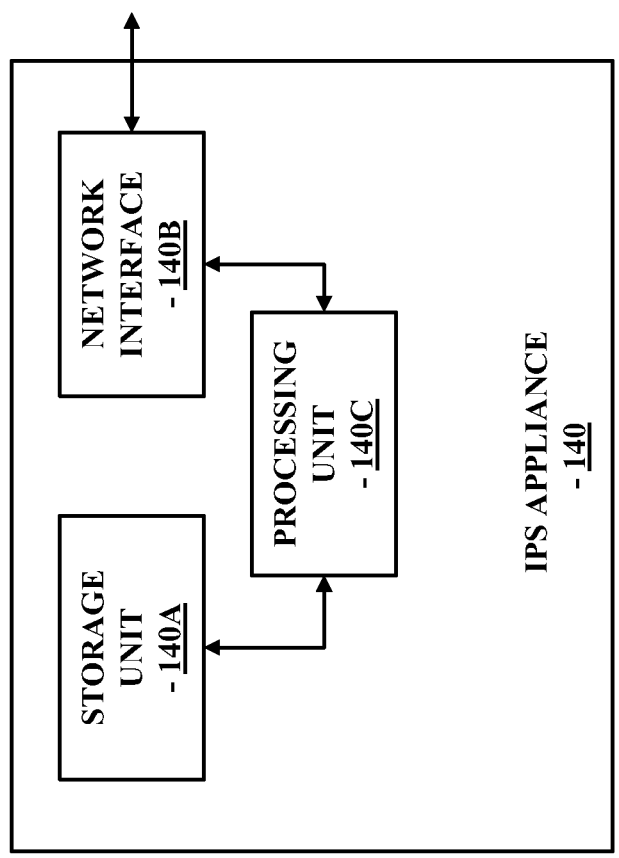
FIG. 2 illustrates an example IPS appliance in the system illustrated in FIG. 1.

FIG. 2 illustrates an example IPS appliance in the system illustrated in FIG. 1. Referring to FIG. 2, the IPS appliance 140 in particular embodiments includes a storage unit 140A operatively coupled to a processing unit 140C. In particular embodiments, the processing unit 140C may include one or more microprocessors for retrieving and/or storing data from the storage unit 140A, and further, for executing instructions stored in, for example, the storage unit 140A, for implementing one or more associated functions related to self generated whitelist for high throughput IPS functionality. Referring again to FIG. 2, in one aspect, the IPS appliance 140 may include a network interface 140B which may be configured to interface with one or more of the switch 150, router 130, or data network 120 (FIG. 1).

In particular embodiments, as discussed in further detail below, the memory or storage unit 140A of the IPS appliance 140 may be configured to store instructions which may be executed by the processing unit 140C to detect network data, generate and/or update a whitelist and retrieve the whitelist associated with the detected network data, and selectively apply an intrusion prevention policy based on the retrieved whitelist.

Figure 3:
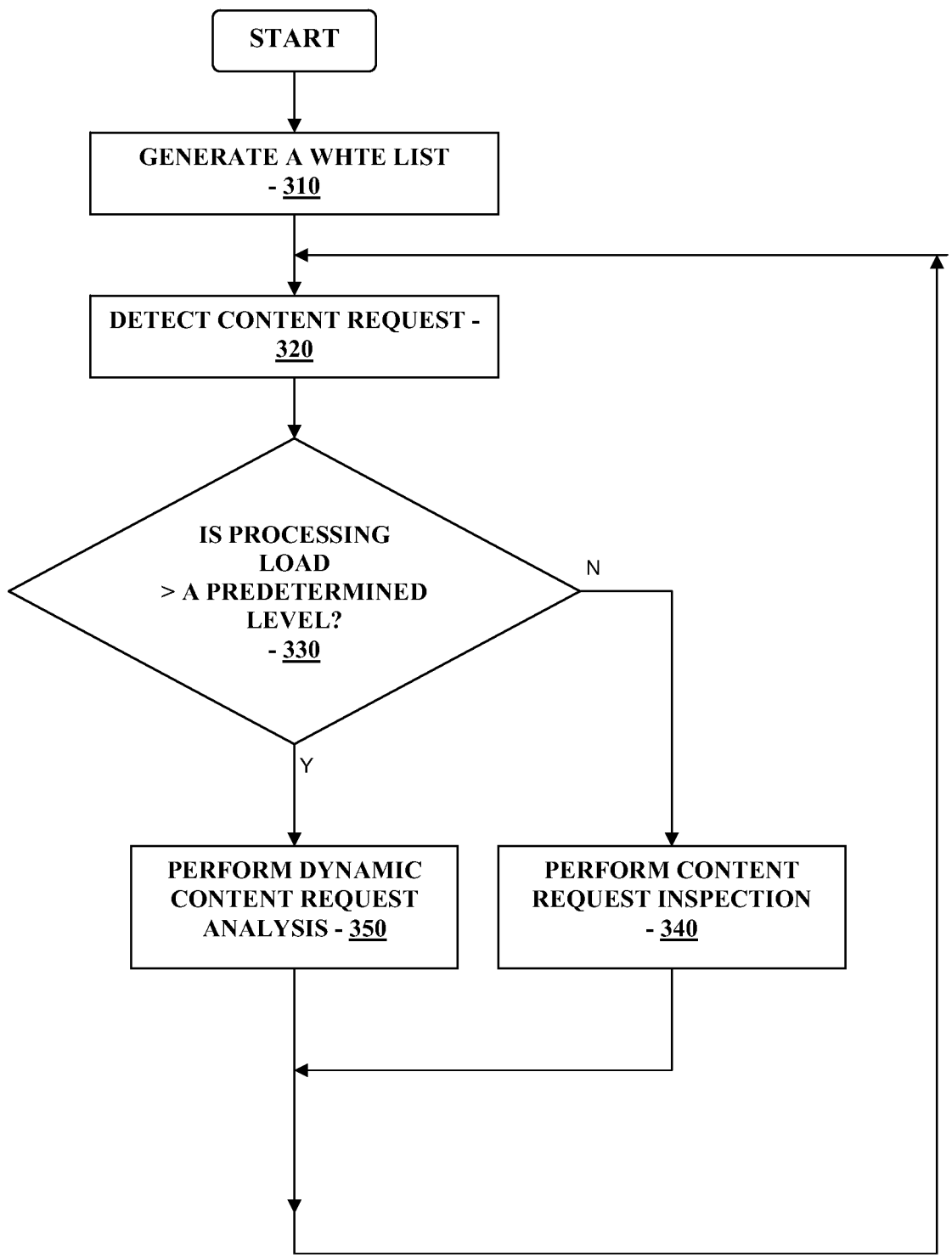
FIG. 3 illustrates an example method for dynamically generating and applying a whitelist for high throughput IPS functionality.

FIG. 3 illustrates an example method for generating and dynamically updating a whitelist for high throughput IPS functionality. Referring to FIG. 3, during a first predetermined time interval which may be configurable, a whitelist is generated at step 310 which may include a list of sources of data traffic such as, for example, websites, IPS addresses, and/or data communication protocols, and which may be derived from the characteristics of the inbound data communication. In particular embodiments, the first predetermined time interval may include 15 minutes or 30 minutes, or any other suitable configurable time interval. More specifically, in particular embodiments, during the first predetermined time interval, IPS appliance 140 (FIG. 1) may be configured to review the data traffic content to determine whether the data content is safe, and if so, listing or appending the whitelist to include the source of the data traffic content (for example, the website or the IP address associated with the source of the data traffic). In addition, the IPS appliance 140 in particular embodiments may be configured to remove the source of the data traffic content if the data content is determined to be unsafe or malicious. In this manner, in particular embodiments, the whitelist is initially generated by, for example, the IPS appliance 140.

Referring back to FIG. 3, after generating the initial whitelist during the first predetermined time interval, at step 320, network data content request is detected, and it is determined whether the processing load of the processing unit of the IPS appliance 140 (FIG. 1) is above or greater than a predetermined level at step 330. In particular embodiments, the predetermined level of the processing load may include, for example but not limited to, 80% of the processing capacity of the processing unit in the IPS appliance 140 (FIG. 1).

Referring again to FIG. 3, if at step 330 it is determined that the processing load is not greater than the predetermined level, then at step 340, network data inspection is performed. More specifically, in particular embodiments, the detected network data is inspected for malicious content and appropriate processing is performed as described in further detail in conjunction with FIG. 4. In particular embodiments, when the processing load is not above the predetermined threshold, the processing unit of the IPS appliance 140 is considered to be under relatively low utilization, and all in bound and/or outbound data traffic is checked for malicious content. After checking for malicious content and updating the whitelist as may be necessary, the routine returns to step 320 to monitor for additional or subsequent network data.

Referring yet again to FIG. 3, if at step 330 it is determined that the processing load of the processing unit of the IP appliance 140 is higher than the predetermined level, at step 350, a dynamic network data analysis is performed, such as, for example, but not limited to statistical analysis, pseudorandom analysis or sampling-sampling analysis. More specifically, in particular embodiments, when network data is detected during the processing load of the processing unit which exceeds the predetermined level, the dynamic network data analysis is executed as described in further detail in conjunction with FIG. 5. More specifically, in particular embodiments, when the processing load of the IPS appliance 140 (FIG. 1) is above the predetermined threshold level, the intrusion prevention system functionality is dynamically executed to achieve greater effective throughput by selectively analyzing network data using the whitelist of safe network data for non-malicious content to minimize processing load. The whitelist may also be updated when dynamic content request analysis is performed.

In this manner, in particular embodiments, the IPS appliance 140 (FIG. 1) may be configured to dynamically self generate and update a whitelist of data traffic which does not require network data to be analyzed when the processing unit of the IPS appliance 140 (FIG. 1) is under heavy processing load. Indeed, in particular embodiments, the IPS appliance 140 (FIG. 1) may be configured to generate and update the whitelist based on prior network data analysis including, for example, but not limited to, the frequency of specific inbound http content that does not include malicious code, and based on a predefined weighing function based on the frequency of the particular inbound http content such that network data that is considered to be free of malicious content is passed through a limited number of times or within a predetermined frequency by the IPS appliance 140 (FIG. 1) without malicious code inspection. Referring back to FIG. 3, in particular embodiments, after performing the dynamic network data analysis at step 350 to update the whitelist as may be necessary, the routine returns to step 320 to monitor for additional or subsequent network data.

Figure 4:
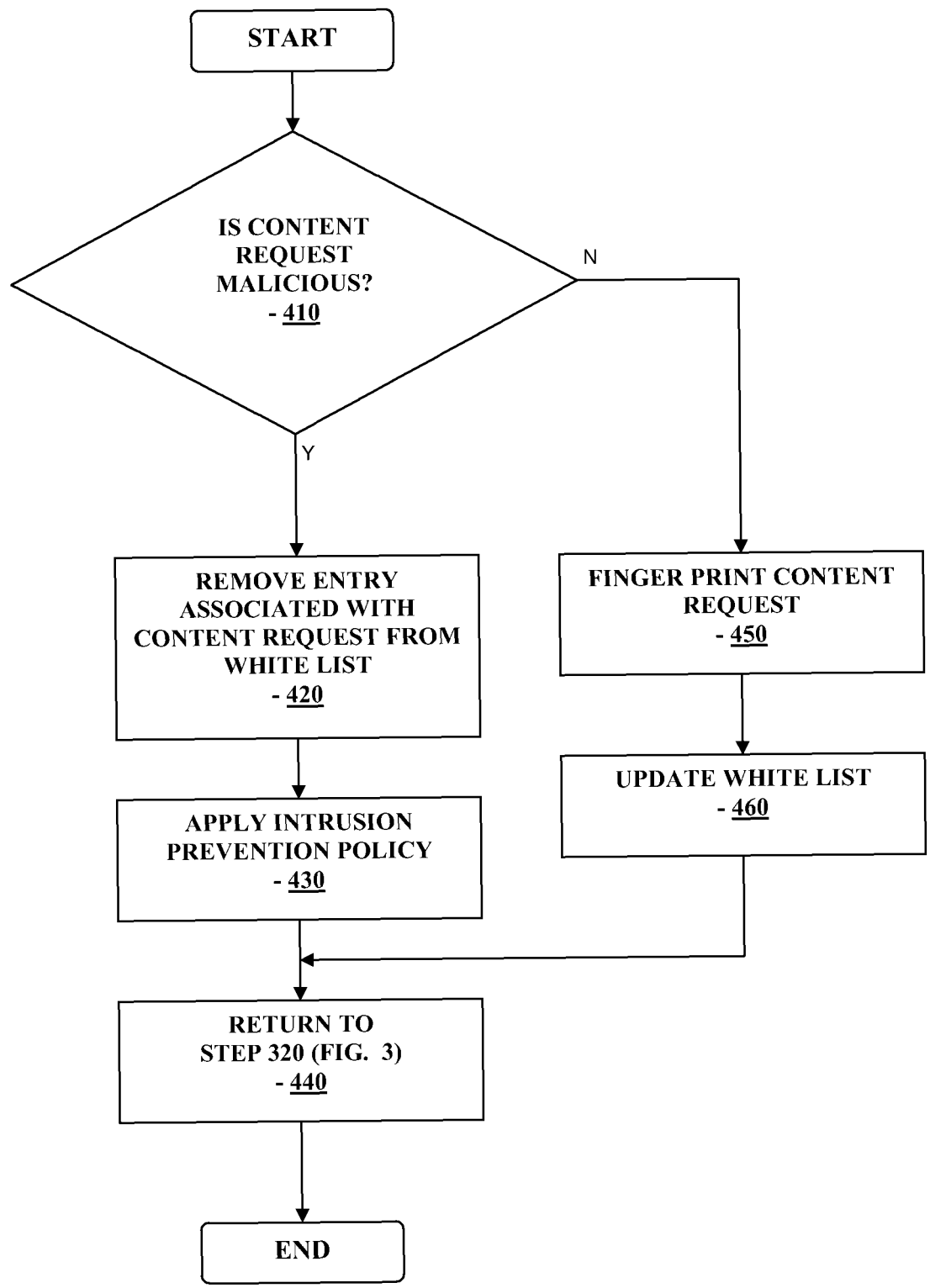
FIG. 4 illustrates an example method for performing network data inspection of FIG. 3.

FIG. 4 illustrates an example method for performing network data inspection of FIG. 3. When the network data is detected during processing load which is under a predetermined level, at step 410, the detected network data is inspected for any malicious code. If at step 410 it is determined that the detected network data includes malicious code, then at step 420, any entry in the current whitelist such as the website or IP address (for example, data source) of the detected network data that is associated with the detected network data is removed from the whitelist. Thereafter, in particular embodiments, one or more suitable intrusion prevention policies is applied to the detected network data with malicious code at step 430, and at step 440, the routine returns to step 320 (FIG. 3) to monitor for subsequent or additional network data.

Referring to FIG. 4, if on the other hand it is determined at step 410 that the detected network data does not include any malicious code, then at step 450 the detected network data is finger printed, and the whitelist is updated at step 460. That is, in particular embodiments, when the detected network data does not include any malicious code, the receipt of the detected network data (or an associated entry in the current whitelist if an entry exists in the whitelist that is associated with the detected network data) is stored in the IPS appliance 140 (FIG. 1), and a respective counter associated with the frequency of receipt of the detected network data is updated. Thereafter, at step 440, the routine returns to step 320 of FIG. 3 to continue to monitor for subsequent or additional network data.

In this manner, in particular embodiments, when the processing load of the IPS appliance 140 (FIG. 1) is at a low utilization state (for example, when the processing load is below the predetermined level), the IPS appliance 140 (FIG. 1) may be configured to perform malicious code inspection and to apply suitable intrusion prevention policy when network data is detected with malicious code, and further, the IPS appliance 140 in particular embodiments may be configured to maintain or update the whitelist based on the frequency of particular network data and whether the particular network data are received with or without malicious code. As such, in particular embodiments, when the processing load of the IPS appliance 140 (FIG. 1) exceeds the predetermined threshold load level, the IPS appliance 140 may be configured to dynamically perform and apply intrusion prevention policies based upon, for example, the frequency of the particular network data, and prior determination of whether any malicious codes were detected with the particular network data.

Figure 5:
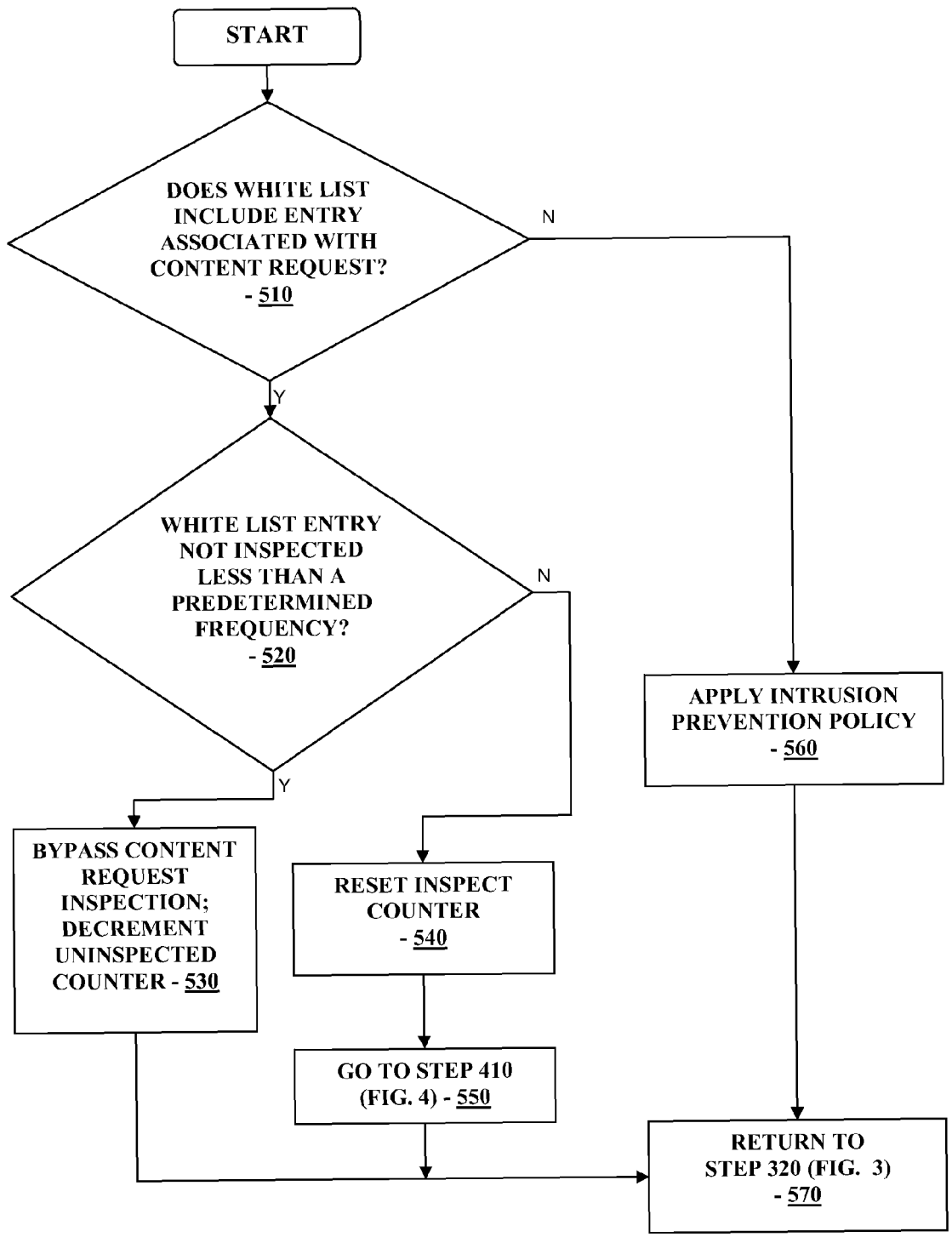
FIG. 5 illustrates an example method for performing dynamic network data analysis of FIG. 3.

FIG. 5 illustrates an example method for performing dynamic network data analysis of FIG. 3. Referring to FIG. 5, when it is determined that the processing load of the processing unit (for example, of the IPS appliance 140 (FIG. 1)) is greater than the predetermined level, at step 510 it is determined whether the detected network data has an associated entry in the current whitelist. That is, it is determined at step 510 whether the particular detected network data was previously determined to not include any malicious code, and thus an entry associated with the particular detected network data is previously stored and exists in the current whitelist.

Referring to FIG. 5, if it is determined that the current whitelist does not include an entry associated with the detected network data, then at step 560, one or more intrusion prevention policies is applied, and the whitelist is updated based on the applied one or more intrusion prevention policies. Thereafter, at step 570, the routine returns to step 320 to monitor for the detection of subsequent or additional network data.

On the other hand, referring back to FIG. 5, if at step 510, it is determined that the current whitelist includes an entry associated with the network data, then at step 520, it is determined whether the entry associated with the network data in the current whitelist has not been inspected less than a predetermined number of times or frequency. That is, in particular embodiments, if it is determined that the current whitelist includes the entry associated with the particular detected network data, then, it is further determined whether the inspection of the particular detected network data has been skipped a predetermined number of times. In particular embodiments, the predetermined number of times that the particular detected network data has been skipped may include, for example, 50 times.

Referring again to FIG. 5, if at step 520 it is determined that the inspection of the particular detected network data has been skipped the predetermined number of times, then at step 540, an inspect counter associated with the particular detected network data is reset to initialize to the predetermined frequency of skipping inspection. For example, in particular embodiments, the IPS appliance 140 (FIG. 1) may be configured to modify a counter associated with the frequency of network data detection, frequency of not inspecting or analyzing the detected network data, and the like.

Referring back to FIG. 5, after resetting the inspect counter to the predetermined frequency as described above, in particular embodiments, at step 550, the routine returns to step 410 of FIG. 4 to determine whether the detected network data includes malicious code. Thereafter, the routines and processes described above in conjunction with FIG. 4 is repeated. On the other hand, if at step 520 it is determined that the particular detected network data has not been skipped the predetermined number of times, then the inspection or analysis of the particular detected network data for inspection is not performed or skipped at step 530, and an associated uninspected counter is decremented. Thereafter, the routine at step 570 returns to step 320 (FIG. 3) to monitor for malicious codes in the subsequent or additional network data.

That is, in particular embodiments, the IPS appliance 140 may be configured to selectively apply intrusion prevention policies to network data based on previous analysis of the particular network data for malicious code when the IPS appliance 140 may be at a processing load which exceeds a predetermined level. In this manner, in particular embodiments, higher effective throughput and faster response for frequently requested content (e.g., web content) may be achieved at a substantially lower hardware cost, and while minimizing any compromise of the level of detection for malicious codes in network data.

In the manner described above, in particular embodiments, the IPS appliance 140 may be configured to generate a whitelist (for example, as a lookup table and stored in the storage unit 140A of the IPS appliance 140) based on specific data traffic which does not include any malicious code or content. The number of entries in the generated whitelist in particular embodiments may be modified and may include in the order of multiple thousands. Moreover, in particular embodiments, the dynamically generated whitelist may be substantially constantly updated while the IPS appliance 140 is at step 320. Additionally, in particular embodiments, the whitelist may be updated during a processing load which is below a predetermined threshold level.

For example, in particular embodiments, the whitelist may be generated during a predetermined variable inspection time period (for example, 30 minutes) and used during the predetermined variable inspection time period. Furthermore, in particular embodiments, during the predetermined variable inspection time period when the generated whitelist is being used, the next or subsequent whitelist is generated (or updated based on the earlier generated whitelist) for use during the subsequent predetermined variable inspection time period. This may be repeated in particular embodiments to continuously update the whitelist based on the data traffic and associated network data received. Entries in the whitelist associated with network data that is most frequently checked or verified in particular embodiments may be logically placed at the top of the whitelist in the order of priority.

When the IPS appliance 140 undergoes a processing load level above a predetermined threshold (for example, 80%), in particular embodiments, network data received during this processing load level may be analyzed only at predefined frequency or percentage (for example, 10%). In particular embodiments, the dynamically updated or refreshed whitelist and associated inspection insures that network data received are considered to be without malicious code or content and thus associated with a respective entry on the whitelist during the processing peak load level.

A method in particular embodiments include detecting network data, generating a whitelist based on the detected network data, where the whitelist includes one or more source information for one or more detected network data, determining a processing load associated with the detected network data, and applying an intrusion prevention policy based on the determined processing load.

In one aspect, determining the processing load may include comparing a current processing load with a predetermined processing level.

Further, when the current processing load exceeds the predetermined processing level, the method may also include bypassing the application of the intrusion prevention policy for detected network data associated with one or more source information in the whitelist.

The detected network data may include malicious content.

In still another embodiment, the method may include updating the whitelist, where updating the whitelist may include determining a predetermined number of occurrences of network data detection.

In still another aspect, when the predetermined number of occurrences of the network data detection is below a predetermined count, the method may include processing the detected network data without applying the intrusion prevention policy.

When the predetermined number of occurrences of the network data detection is at or above a predetermined count, the method may include applying the intrusion prevention policy on the detected network data.

In a further aspect, the one or more source information may include one or more Internet Protocol (IP) address or data communication protocol.

An apparatus in particular embodiments includes a storage unit, and a processing unit operatively coupled to the storage unit, the processing unit configured to detect network data, generate a whitelist based on the detected network data, where the whitelist includes one or more source information for one or more detected network data, determine a processing load associated with the detected network data, and apply an intrusion prevention policy based on the determined processing load.

The processing unit may be further configured to compare a current processing load with a predetermined processing level.

When the current processing load exceeds the predetermined processing level, the processing unit may be further configured to bypass the application of the intrusion prevention policy for detected network data associated with one or more source information in the whitelist.

Further, the processing unit may be further configured to update the whitelist.

Also, the processing unit may be further configured to determine a predetermined number of occurrences of network data detection.

When the predetermined number of occurrences of the network data detection is below a predetermined count, the processing unit may be configured to process the detected network data without applying the intrusion prevention policy.

When the predetermined number of occurrences of the network data detection is at or above a predetermined count, the processing unit may be configured to apply the intrusion prevention policy on the detected network data.

The storage unit may be configured to store the whitelist.

An apparatus in particular embodiments include means for detecting network data, means for generating a whitelist based on the detected network data, where the whitelist includes one or more source information for one or more detected network data, means for determining a processing load associated with the detected network data, and means for applying an intrusion prevention policy based on the determined processing load.

The various processes described above including the processes performed by the IPS appliance 140 in the software application execution environment in the example system 100 including the processes and routines described in conjunction with FIGS. 3-5, may be embodied as computer programs developed using an object oriented language that allows the modeling of complex systems with modular objects to create abstractions that are representative of real world, physical objects and their interrelationships. The software required to carry out the inventive process, which may be stored in the memory or storage unit 140A of the IPS appliance 140 may be developed by a person of ordinary skill in the art and may include one or more computer program products.

Various other modifications and alterations in the structure and method of operation of the particular embodiments will be apparent to those skilled in the art without departing from the scope and spirit of the disclosure. Although the disclosure has been described in connection with specific particular embodiments, it should be understood that the disclosure as claimed should not be unduly limited to such particular embodiments. It is intended that the following claims define the scope of the present disclosure and that structures and methods within the scope of these claims and their equivalents be covered thereby.

What is claimed is:

1. A non-transitory machine-readable medium comprising machine-readable instructions stored on the machine-readable medium, the machine-readable instructions being effective to cause a machine to:
   determine a processing load associated with detected network data having source information;
   when the processing load is determined to not exceed a predetermined processing level, apply an intrusion prevention policy that analyzes the detected network data;
   when the processing load is determined to exceed the predetermined processing level, further determine whether the source information of the detected network data is associated with source information in a whitelist;
   when the computing device has determined that the processing load exceeds the predetermined processing level and has determined that the source of the network data is associated with source information in the whitelist, bypass application of the intrusion prevention policy, and
   when the computing device has determined that the processing load exceeds the predetermined processing level and has determined that the detected network data is not associated with source information in a whitelist, apply the intrusion prevention policy;
   and update the whitelist to include source information for network data that does not include malicious content.

2. The non-transitory machine-readable medium of claim 1 wherein the processing load was determined to not exceed a predetermined processing level, and the intrusion prevention policy identified the detected network data as including malicious content, update the whitelist to remove source information for network data that includes malicious content.

3. The non-transitory machine-readable medium of claim 1 wherein updating the whitelist includes determining a predetermined number of occurrences of network data detection.

4. The non-transitory machine-readable medium of claim 3 wherein when the predetermined number of occurrences of the network data detection is below a predetermined count, processing the detected network data without applying the intrusion prevention policy.

5. The non-transitory machine-readable medium of claim 3 wherein when the predetermined number of occurrences of the network data detection is at or above a predetermined count, applying the intrusion prevention policy on the detected network data.

6. The non-transitory machine-readable medium of claim 1 wherein the one or more source information includes one or more Internet Protocol (IP) addresses or data communication protocols.

7. An apparatus, comprising:
   a storage unit storing a whitelist having source information for network data; and
   a processing unit operatively coupled to the storage unit, the processing unit configured to detect network data, configured to determine a processing load associated with the detected network data, and in response to the processing load not exceeding a predetermined processing level, the processing unit is configured to apply an intrusion prevention policy that analyzes the detected network data, and in response to the processing load exceeding the predetermined processing level, and when the detected network data is associated with source information in the whitelist, the processing unit is configured to bypass application of the intrusion prevention policy; and the processing unit is further configured update the whitelist to include source information for network data that does not include malicious content.

8. The apparatus of claim 7 wherein the processing load was determined to not exceed a predetermined processing level, and the intrusion prevention policy identified the detected network data as including malicious content, update the whitelist to remove source information for network data that includes malicious content.

9. The apparatus of claim 7 wherein the processing unit is further configured to determine a predetermined number of occurrences of network data detection.

10. The apparatus of claim 9 wherein when the predetermined number of occurrences of the network data detection is below a predetermined count, the processing unit is further configured to process the detected network data without applying the intrusion prevention policy.

11. The apparatus of claim 9 wherein when the predetermined number of occurrences of the network data detection is at or above a predetermined count, the processing unit is further configured to apply the intrusion prevention policy on the detected network data.

12. The apparatus of claim 7 wherein the one or more source information includes one or more Internet Protocol (IP) addresses or data communication protocols.

13. The apparatus of claim 7 wherein the storage unit is configured to store the whitelist.

14. A network-device implemented method comprising:

determining that a processing load associated with received network data having source information is above a processing level;

determining whether the source of the received network data is associated with source information in a whitelist;

conditional upon a result of the determination of whether the source information of the received network data is associated with source information in the whitelist, performing one of: bypassing application of an intrusion prevention policy when it has been determined that the source information of the received network data is associated with source information in the whitelist, and applying the intrusion prevention policy when it has been determined that the received network data is not associated with the source information in the whitelist; and updating the whitelist to include source information for network data that does not include malicious content.

* * * * *